United States Patent [19]

Schrod et al.

[11] Patent Number: 5,078,556
[45] Date of Patent: Jan. 7, 1992

[54] 3-PHASE CRANKSHAFT MACHINING

[75] Inventors: Hans Schrod, Göppinge; Wolf-Dietrich Voss, Boll, both of Fed. Rep. of Germany

[73] Assignee: Boehringer Werzeugmaschinen GmbH, Fed. Rep. of Germany

[21] Appl. No.: 581,513

[22] Filed: Sep. 12, 1990

[30] Foreign Application Priority Data

Sep. 12, 1989 [DE] Fed. Rep. of Germany ....... 3930489

[51] Int. Cl.$^5$ .................... B23D 37/22; B23C 3/06; B23B 5/18
[52] U.S. Cl. .................... 409/132; 82/106; 409/166; 409/244; 409/269
[58] Field of Search .................... 29/6.01; 82/106; 409/131, 132, 165, 166, 240, 244, 264–271, 281, 282, 286, 287

[56] References Cited

U.S. PATENT DOCUMENTS

| | | | |
|---|---|---|---|
| 2,173,609 | 9/1939 | Groene | 82/106 |
| 2,525,127 | 10/1950 | Groene et al. | 82/106 X |
| 4,269,551 | 5/1981 | Kralowetz | 409/132 |

FOREIGN PATENT DOCUMENTS

| | | | |
|---|---|---|---|
| 286771 | 10/1988 | European Pat. Off. | 82/106 |
| 3102 | 1/1981 | Japan | 82/106 |
| 8765 | 11/1988 | PCT Int'l Appl. | 82/106 |

Primary Examiner—Steven C. Bishop
Attorney, Agent, or Firm—Ostrolenk, Faber, Gerb & Soffen

[57] ABSTRACT

The present invention relates to a method and an apparatus for the finish-machining of the bearing diameters, particularly the main bearing diameters and of the adjoining cheek side surfaces on crankshafts and similar workpieces in a single chucking. In order that this machining can be carried out rapidly and nevertheless with a high quality of production, the following method steps are carried out, one after the other: milling of the cheek side surfaces to nominal size up to the bearing diameter; turning of the bearing diameter down to a small oversize; turning-broaching of the bearing diameters to nominal size in order to obtain a good quality surface, and possibly turning/turning-broaching of recesses, clearance cuts and undercuts in the region of the bearings.

20 Claims, 2 Drawing Sheets

3-PHASE CRANKSHAFT MACHINING

BACKGROUND OF THE INVENTION

The present invention relates to the machining of the bearing diameter, particularly the main-bearing diameters, as well as of the adjoining cheek-side surfaces on crankshafts and similar workpieces.

In the case of these workpieces, it is desired not only, in particular, to obtain the highest possible precision upon production both of the roundness and of the desired diameter, especially of bearing diameters but, in addition, to obtain a manufacture which is as cost-favorable as possible, as is true in the case of all mass-produced workpieces. In order to achieve these goals, which frequently diverge in their effects, the machining method which seemed optimal was in the past already selected, namely cutting, milling or grinding. In addition, it is also clear that frequent rechucking of the workpiece during the machining leads, due to slight differences upon the rechucking, to inaccuracies in manufacture or at least to an increase in the time required for the next machining steps, so that complete machining in a single chucking is desirable.

In addition to the machining methods indicated above, so-called turning-broaching is also already known from German Application P 35 23 274; in it a disk-shaped broaching tool which has cutting edges on its circumference rotates slowly during the machining with respect to the rapidly rotating workpiece and machines the circumferential surface thereof. In this connection, the infeed movement can be effected in the manner that the individual cutting edges have an increasing distance from the center point of the turning-broaching tool on the circumferential surface of said tool. The infeed movement can, however, also be effected in the manner that all cutting edges are at the same distance from the center of the tool and the infeed movement is effected by a radial movement of the entire tool towards the workpiece. By this so-called turning-broaching, greater precision than with normal turning can be obtained upon the production of the bearing diameters. To be sure, the number of cutting edges of the turning-broaching tool is limited by the circumference of the tool, so that only limited radial oversizes of the workpiece can be removed.

Therefore, a combination of turning and turning-broaching, carried out on a single machine tool, has gained acceptance recently for the finish-machining of crankshafts. In this connection, both cutting edges used for the plunge-cut turning and cutting edges used for the turning-broaching are present on the tool, which is swingable around an axis parallel to the longitudinal axis of the workpiece. In the simplest case, a plunging-turning edge which has the width of the entire bearing diameter to be machined is present on this tool as well as a turning-broaching cutting edge which also has the full width of the bearing diameter to be produced. With the plunging turning tool—which in practice, is normally narrower than the length of the bearing diameter in order to avoid chattering—the bearing diameter is, first of all, cut down from the original high oversize to a very small oversize on the order of about 1/10 mm. The tool is then withdrawn from the workpiece and, while maintaining a high speed of rotation of the workpiece on the order of about 1000 rpm, the turning-broaching cutting edge of the swingable tool is swung in an arcuate path into the bearing diameter to be produced, the swinging movement being of such a speed that the turning-broaching cutting edge remains in engagement for more than one and generally for about two revolutions of the workpiece. With this turning-broaching machining, the bearing diameter of the crankshaft is completely machined to such an extent that pre-grinding can be dispensed with so that only finish-grinding is effected.

The machining of the side surfaces of the cheeks, which is effected by surfacing with a lathe tool, is effected before said machining.

In addition, recesses or even undercuts, etc., which are, for instance, required in the cheek side surfaces in the vicinity of the bearing diameter, must be produced by plunge feeding or turning-broaching, etc. The tools for this are also integrated in the swingable tool.

Although a faster advance of the machining, particularly upon the plunge-cutting, can be obtained by means of traditional turning than upon a turning-broaching which provides a good surface—particularly upon the removal of large amounts of material—milling is usually even faster but, to be sure, it results in a substantially poorer surface than turning-broaching or normal turning.

SUMMARY OF THE INVENTION

Starting from this, the object of the invention is to provide a method, as well as an apparatus for the carrying out thereof, by means of which cheek side surfaces as well as bearing diameters on crankshafts can be produced rapidly and nevertheless with a high quality of production.

Only slight demands are made on the quality of the machining of the side surfaces of the cheeks. At the same time, not only must the largest radial advance of machining be carried out there but, at the same time, the largest amount of material to be removed is also present there.

In this connection, first of all the cheek side surface adjoining the bearing diameter, or even both adjoining cheek side surfaces depending on the stability of the workpiece, are machined simultaneously by, for instance, a disk-shaped outer miller which works slowly from the outer edge of the cheeks towards the bearing diameter. Depending on the dimensioning of the milling tool and of the cheek to be machined, the workpiece is, in this connection, stationary, at least at the start, and will possibly slowly turn further upon reaching the desired radial depth of infeed so as to obtain advance of the machining in the direction of rotation of the crankshaft along the cheek side surface. For this, naturally, a so-called C-axle drive, where the rotational position of the drive of the workpiece can be controlled, is necessary.

If such a drive is not present, but, instead of this, as shown in the embodiment, the Y-axis is developed for the milling unit, it is then sufficient to align the cheek directly on the milling unit and allow the latter to work forward towards the bearing diameter. In this way, after the desired depth of milling has been reached, further material on the cheek side wall which is to be removed remains alongside the disk miller. In order to reduce it, the milling unit is now moved on both sides in Y direction. In this way, the remaining amounts, to be sure, are not completely eliminated but are sufficiently small not to impair the function of the workpiece.

Nor is this disturbing for the machining of the bearing diameters, since the side surfaces of the cheeks are in any event arranged still further back with respect to the outer limitations of the bearing diameters in the lengthwise direction. In view of this, the machining sequence can also be so selected that first of all, the bearing diameter is machined by turning and turning-broaching before the cheek side surfaces are machined by milling.

After completion of this machining step, the milling tool is withdrawn from the workpiece and the known combined turning/turning-broaching tool is placed in action, the bearing diameter itself being finish-machined by it in known manner and any recesses, etc. in the cheek side surfaces, etc. which are still required are produced.

During this machining the workpiece, of course, remains firmly chucked, it being dependent primarily on the stability of the workpiece whether this chucking is effected on both sides by rotation-driveable chucks, or on one side only by a center point.

In order to be able to finish-machine a crankshaft in this way without rechucking, both the milling unit and the combined turning/turning-broaching unit must be moveable in each case independently at least in X direction without interfering with each other. If several bearing places on a crankshaft are to be machined one after the other, the possibility of movement of these machining units also in Z direction is furthermore necessary.

The arrangement of the two machining units diametrically opposite each other with respect to the workpiece is advantageous, the X direction being furthermore selected vertical in order, in this way, to assure, on the one hand, a good dropping off of the chips and, on the other hand, a good possibility of observing the progress of the machining.

The vertical displaceability of the two machining units above and below the workpiece can be realized with different designs of the bed which differ with respect to the arrangement of the guide planes for the displacement in the Z direction of the carriages on which the machining units are mounted.

For this purpose, there is advantageously employed a machine bed which consists, in known manner, of a bed lower part of, for instance, polymer concrete and a metal bed upper part, two separate guide planes arranged at an angle to each other being provided on the bed upper part for the guiding of individual components in Z direction. A bed slide on which in each case one machining unit is mounted, can be guided in each of the two guide planes.

The bed upper part, in this connection, has a shape such as known from German Application P 39 21 649: the two guide planes are arranged at a right angle to each other, the first guide plane, the upper one, descending forward towards the operator from the rear region of the lathe and the second guide plane extending downward and rearward from the front edge of the first guide plane, thereby forming an overhang. Furthermore, except for the uppermost guide surface of the second guide plane, all guide surfaces are so steep or even overhanging that no metal chips can deposit thereon. The guide surfaces of the first guide plane all lie above the lathe center. In this connection, the individual guides have, in part, a plurality of guide surfaces one of which in each case is always parallel to the corresponding guide plane to which the corresponding guide belongs. Furthermore, the second guide plane has a guide which has two guide surfaces each of which is parallel to one of the two guide planes. This guidance lies in the vicinity of the point of intersection of the two theoretical guide planes. From said Application, there can also be noted in detail the advantages of this bed design, namely, stated roughly, an unimpeded dropping off of the chips, which however, need not be obtained by the disadvantage of machining units which protrude horizontally from the bed and of the turning moments which result thereby already from the force of gravity. Due to this form of bed, an additional possibility of movement in Y direction can also be provided, which, to be sure, is not absolutely necessary just for the machining described of a crankshaft but makes possible the manufacture of additional details on the workpiece.

Other features and advantages of the present invention will become apparent from the following description of the invention which refers to the accompanying drawings.

BRIEF DESCRIPTION OF THE DRAWINGS

One embodiment of a machine tool for the carrying out of the method described will be described below by way of example on basis of FIGS. 1 and 2, in which.

DETAILED DESCRIPTION OF THE DRAWINGS

Figure 1:
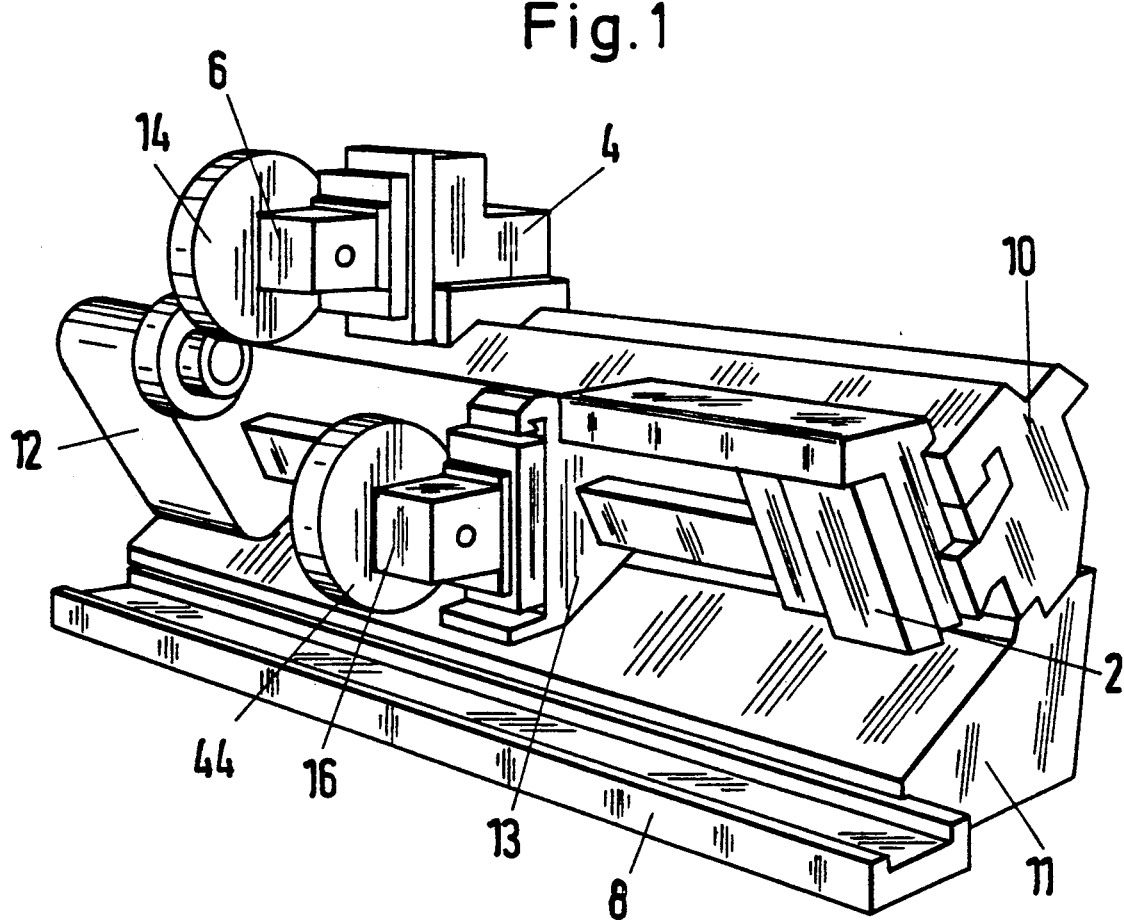
FIG. 1 is an overall view in perspective of the machine tool without workpiece.

On the end of the bed 1 which can be noted on the right-hand side of FIG. 1 there is the division into the bed lower part 11, consisting usually of concrete and having an approximately triangular cross section, and the metal bed upper part 10 seated thereon which is of approximately rectangular cross section. This bed upper part 10 with its rectangular cross section is, however, set obliquely so that its upper surface is inclined obliquely forward and therefore towards the operator of the machine tool.

One of the two machining units of the machine tool is guided on this upper surface of the bed upper part 10. For this purpose, a bed carriage 3 can move on the upper surface of the upper part of the bed in the longitudinal direction of the machine and therefore in Z direction. On this bed carriage 3, an upper support 4 is moveable transverse to the Z direction towards and away from the operator, whereby the Y axis of the machine tool is also realized.

The X axis of the machine tool is realized by a cross slide 5 which is moveable in vertical direction on the upper support 4. The milling unit 6 which bears the externally toothed disk mill 14 and drives it is fastened on this cross slide 5. This disk mill 14 is shown as a simple disk in FIG. 1, and only a few teeth of the disk mill 14 are shown symbolically in FIG. 2 also.

The machine tool furthermore also comprises the headstock 12 as well as the tailstock 2 for the attachment and drive of the crankshaft as well as another machining unit, both of them however being guided on the overhanging front surface of the bed upper part 10. Since in the second machining unit only the X axis but not the Y axis is realized, the cross slide 15 is fastened directly vertically on the bed carriage 13.

Figure 2:
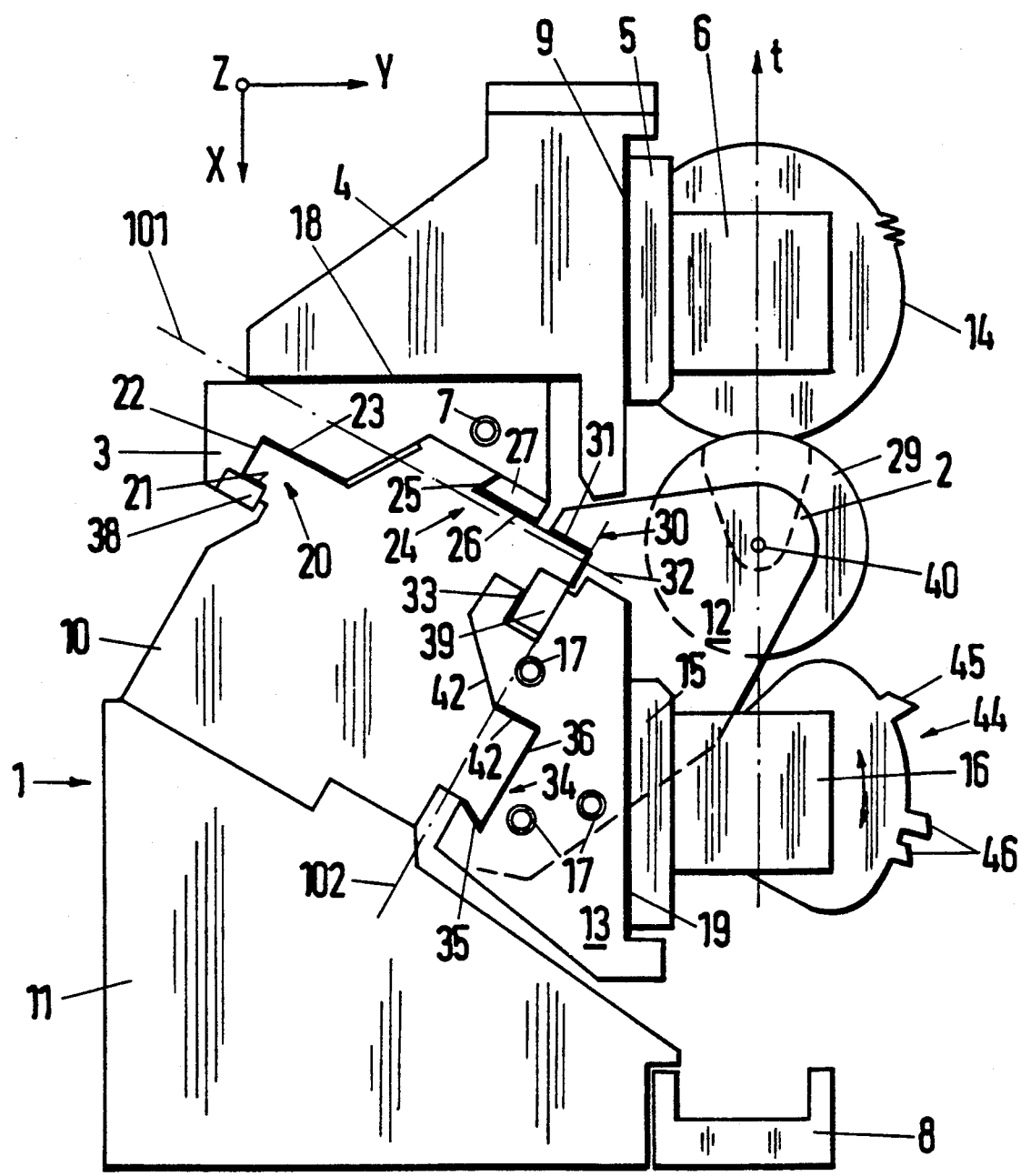
FIG. 2 is a cross section through the machine tool of FIG. 1.

As shown in FIG. 2, neither the lower machining unit nor the headstock 12 has contact with the oblique front surface of the bed lower part 11, which serves, inter alia, for the removal of the chips falling thereon into the chip conveyor 8 which is present in front of the bed 1 and is shown diagrammatically in the form of a trough.

In FIG. 2, in addition to the groups explained in connection with FIG. 1, the individual guides and guide surfaces are shown on which the relative displacement of the individual components with respect to each other takes place: On the top of the bed upper part 10, the bed carriage 3 which bears the milling unit is guided in Z direction by means of two guides 20, 24. Each of these guides consists of a plurality of guide surfaces, the guide surfaces 21 and 23 of the guide 20 as well as the guide surface 26 of the guide 24 lying in the direction of the guide plane 101 and therefore obliquely forward towards the operator. In addition, each of the two guides 20 and 24 has a guide surface 22 and 25 respectively, which surfaces extend transverse to the direction of the other guide surfaces. In this way the guide surfaces 22 and 23 of the guide 20 form an upward extending ridge-shaped prism which is supplemented to form a U-shaped guide by additional guide surfaces 21 which adjoin the guide surface 22 and are parallel to the guide surface 23. For the mounting and removal of the bed carriage 3, there is therefore necessary a ledge 38 which is removable from the bed carriage 3, engages behind said U-shaped guide 20 and rests against the guide surface 21.

In the case of the guide 24, the guide surfaces, in contradistinction to those of the guide 20, are not in each case at a right angle to each other; rather the two guide surfaces 25 and 26 are at an acute angle to each other and thus form practically half a dovetail guide. The part of the bed carriage 3 which engages in this guide 24 is also developed removably as a V-ledge 27.

The drive of the bed carriage is effected via the drive spindle 7 shown in FIG. 2.

Furthermore, it can be noted in FIG. 2 in connection with this upper tool unit that, despite the inclined guide plane 101 along which the bed carriage 3 is displaced on the bed upper part 10, the upper carriage 4 which is displaceable transversely to the length of the machine is displaced along a horizontally lying guide 18. On this upper carriage 4, in its turn, the cross carriage 5 is moveable vertically in the direction to and away from the center of rotation 40 of the workpiece.

Although this realizing of the Y axis is not necessary for the machining by a milling unit described, it must be assumed that this Y axis is nevertheless already present in many cases, namely when an existing lathe is re-equipped by replacing a tool unit with the milling unit.

Vertical and horizontal course of X and Y axes facilitate not only the comprehending of the tool movements by the operator but also the programming of the machine, which is increasingly being left to the operator.

Corresponding to the vertically placed X axis, the second machining unit, namely the combined turning-/turning-broaching unit 44 lies precisely below the disk mill 14, as indicated by the line t. The bed carriage 13 which moves the turning/turning-broaching unit 44 in Z direction is guided in the guide plane 102, on top on the guide surface 33 and on bottom on the guide 34 which consists of the guide surface 36 which overhangs and is parallel to the guide plane 102 and of the guide surface 42 which adjoins it at a right angle, as well as of a guide surface 35 which adjoins it at the bottom at an acute angle and is held, for instance, by PEKU units against same.

All guide surfaces of these guides are located behind the upper front edge of the bed upper part 10 which extends furthest forward and are thus protected from chips, tools and other objects dropping down from above. The drive spindles 7 and 17 serve for the Z-movement of the bed carriage.

Furthermore, in FIG. 2 both the turning-plunge tool 45 and two turning-broaching cutters 46 are shown diagrammatically on the turning/turning-broaching unit 44. In the event that the bearing diameter to be machined is a large machining width, then, of course, in order to avoid chatter movements the plunge cutting can take place in several partial operating steps alongside of each other, either by repeated withdrawal and infeed of the turning/turning-broaching unit 44 or else by a plurality of plunge lathe tools 45 arranged spaced apart on this unit 44, provided in each case for the machining of a partial region.

Similarly, in the present case there are shown symbolically two turning-broaching cutters 46 which are at an increasing distance from the center point of the turning-/turning-broaching unit 44 so that the infeed movement in this case is located in the increasing distance between the cutting edges and the center point. Of course, with correspondingly small oversize to be removed, these turning/turning-broaching cutters can be reduced to a single one or even, in the case of the presence of a plurality of turning-cutting broaches, they can be at the same distance from the center point of the turning/turning-broaching unit, in which case the infeed must be effected by an X movement of the tool holder unit 16. In this case, the infeed movement must be carried out when none of the turning-broaching cutters 46 is in engagement. For this, however, with a diameter of the turning/turning-broaching unit 44 of about 700 mm, a distance between cutters of 9° is, for instance, sufficient.

Theoretically, furthermore, for the carrying out of the turning plunge feed process, as well as of the turning-broaching process, one and the same cutting edge could be used. Since for both machining processes, however, geometrically slightly differently shaped cutting edges lead in each case to optimum machining results, the restriction to merely a single common cutting edge is dispensed with. The milling unit 6 in the present case is arranged above the turning center 40 and therefore the workpiece 29, since the turning/turning-broaching unit lying below it is less susceptible to, for instance, a jamming of the plunge cutting turning tool 47 with the workpiece 29 occurring due to chips falling down from above. With the reverse arrangement, on the other hand, chips could fall more easily into the spaces between the teeth of the disk mill 14 and lead there to an unsatisfactory result of the machining or to damage to the tool. Of course, further baffle plates, etc. can be arranged in front of the machine in order to conduct the chips falling down from the machine to the chip conveyor, but most of the small chips which easily fly about are produced upon the milling, in which connection it is possible, by selection of the direction of turning, to have these chips fly in the direction towards the machine and not of the operator, in which connection, of course, the entire machine is covered by a protective cover in order to protect the operator.

Furthermore, the turning/turning-broaching unit may have still other plunge cutting tools such as necessary for the establishing of required recesses, etc. in the limit region between bearing diameter and cheek side surface.

After this machining of the crankshaft, the pregrinding which is otherwise customary can be dispensed with, so that merely a finish grinding of the bearing diameter, and therefore the removal of a very small oversize, is still necessary.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for finish-machining of main bearing diameters and adjoining cheek side surfaces on crankshafts and similar workpieces in one chucking, comprising the steps of:
    milling said cheek side surfaces to nominal size up to said bearing diameter;
    turning said bearing diameter down to a slight oversize; and
    turning-broaching said bearing diameter to nominal size in order to obtain a good quality surface.

2. The method of claim 1, including the step of turning and/or turning-broaching recesses, clearance cuts, and undercuts in the region of the bearing.

3. A method according to claim 1, characterized by the fact that the oversize amounts to about 1/10 mm after the turning of the bearing diameter.

4. A machine tool for the carrying out of the method of claim 1, in which the workpiece is chucked driveable in rotation in the machine and the machine tool has at least two machining units which are moveable independently of each other at least in an X direction, at least one machining unit having a milling unit and at least one machine unit having a turning/turning-broaching unit.

5. A machine tool according to claim 4, characterized by the fact that the milling unit has at least one disk-shaped outer miller.

6. A machine tool according to claim 4, characterized by the fact that the turning/turning-broaching unit has, in addition to
    a plunge-cutting tool for the turning of the bearing diameter to the full width, and
    a turning-broaching cutting edge for the turning-broaching of the bearing diameter to the full width, at most additional turning tools for the turning of grooves in the cheek side surfaces, on a tool carrier which is swingable around an axis parallel to the longitudinal axis of the workpiece.

7. A machine tool according to claim 6, characterized by the fact that the tool carrier for the turning/turning-broaching unit is approximately disk-shaped.

8. A machine tool according to claim 4, by the fact that the machining units are opposite sides with respect to the workpiece.

9. A machine tool according to claim 4, characterized by the fact that the X axis of the machine tool is arranged vertically.

10. A machine tool according to claim 4, characterized by the fact that, the machine tool has a machine bed with two guide planes in a Z direction lying at an angle to each other, in which connection
    in each guide plane to which a plurality of guides having individual guide surfaces belong, there travels at least one bed carriage displaceable in said Z direction on which there is present one of the machining units displaceable in said X direction,
    the two guide planes lie at a right angle to each other,
    the first guide plane descends from the rear region of the lathe towards the front and therefore towards an operator's side, and
    the second guide plane extends from the front region of the first guide plane downward and rearward, thereby forming an overhang.

11. A machine tool according to claim 9, characterized by the fact that except for the uppermost guide surface of the second guide plane, all guide surfaces of the second guide plane which are required for the lower bed carriage are so steep or even overhang in such a manner that no metal chips can deposit thereon.

12. A machine tool according to claim 9, characterized by the fact that the second guide plane has a guide with two guide surfaces, the one guide surface lying parallel to the first guide plane and the other guide surface lying parallel to the second guide plane, and that the second guide plane has at least one other guide which is parallel to the guide surface lying parallel to the second guide plane of the guide belongs.

13. A machine tool according to claim 9, characterized by the fact that each guide or of a given guide plane has at least one guide surface which is parallel to the corresponding guide plane.

14. A machine tool according to claim 9, characterized by the fact that all guide surfaces of the first guide plane lie higher than the guide surfaces of the second guide plane.

15. A machine tool according to claim 9, characterized by the fact that the one guide of the second guide plane lies in horizontal direction in front of the other guide surfaces of the first guide plane.

16. A machine tool according to claim 9, characterized by the fact that the guide surfaces of the uppermost guide of the second guide plane lie close together.

17. A machine tool according to claim 9, characterized by the fact that the guide surfaces of the uppermost guide of the second guide plane adjoin each other.

18. A machine tool according to claim 9, characterized by the fact that the guide surface of the uppermost guide of the first guide surface is arranged at the greatest possible distance from the first guide of the second guide surface.

19. A machine tool according to claim 9, characterized by the fact that the bed upper part consists of cast iron which is bonded to the bed lower part consisting of cement concrete and, in addition, is bolted thereon by means of long stretch bolts which are guided in large bore holes which are at least twice as large as the diameter of the stretch bolts.

20. A machine tool according to claim 9, characterized by the fact that rollers are arranged in each case between the bed upper part and the head of the stretch bolts in order to permit an offset of the bed upper part with respect to the bed lower part and the stretch bolts which are screwed there without additional stretching of the stretch bolts.

* * * * *